United States Patent [19]

Kotter et al.

[11] Patent Number: 5,200,383
[45] Date of Patent: Apr. 6, 1993

[54] METHOD FOR THE PRODUCTION OF CATALYTICALLY ACTIVE MIXED PHASES

[75] Inventors: Michael Kotter, Bruchsal; Friedrich Weyland, Leimen-St. Ilgen, both of Fed. Rep. of Germany

[73] Assignee: Kraftanlagen Aktiengesellschaft, Heidelberg, Fed. Rep. of Germany

[21] Appl. No.: 382,785
[22] PCT Filed: Oct. 8, 1988
[86] PCT No.: PCT/EP88/00902
  § 371 Date: May 10, 1990
  § 102(e) Date: May 10, 1990
[87] PCT Pub. No.: WO89/03244
  PCT Pub. Date: Apr. 20, 1989

[30] Foreign Application Priority Data

Oct. 12, 1987 [DE] Fed. Rep. of Germany ....... 3734429

[51] Int. Cl.$^5$ ............................................. B01J 35/02
[52] U.S. Cl. .................................................. 502/300
[58] Field of Search ................ 502/300, 318, 324, 350

[56] References Cited

U.S. PATENT DOCUMENTS 3,966,639  6/1976  Callahan et al. ................ 502/300 X
4,170,570 10/1979  Zagata et al. .................... 502/318 X Primary Examiner—W. J. Shine

[57] ABSTRACT

Method for the production of catalytically active mixed phases in powder form from precursors which contain the elements of the mixed phase and are treated thermally and mechanically.

The precursor or precursors contained in a solution or suspension are applied to heated surfaces of moving heat carrying bodies and precipitated and dissociated on them with evaporation of the solvent or of the liquid component of the suspension. The mixed phase formed on the heat carrying bodies is removed from the heat carrying bodies and then, to prepare it for further use, it is crushed.

10 Claims, 1 Drawing Sheet

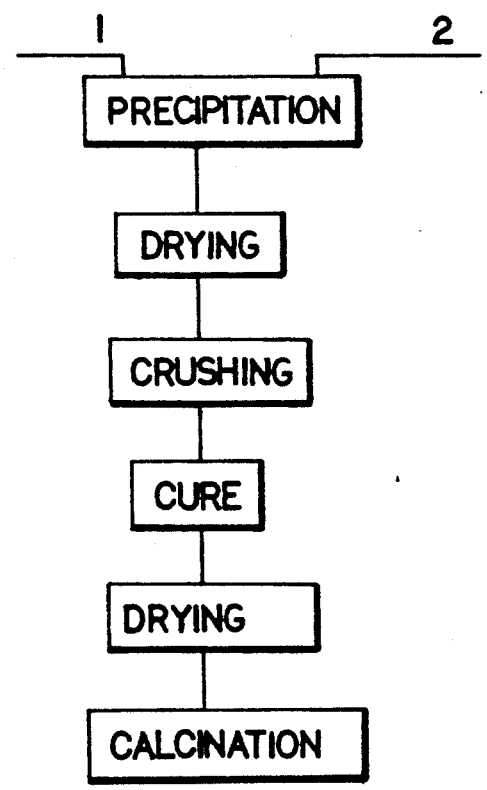 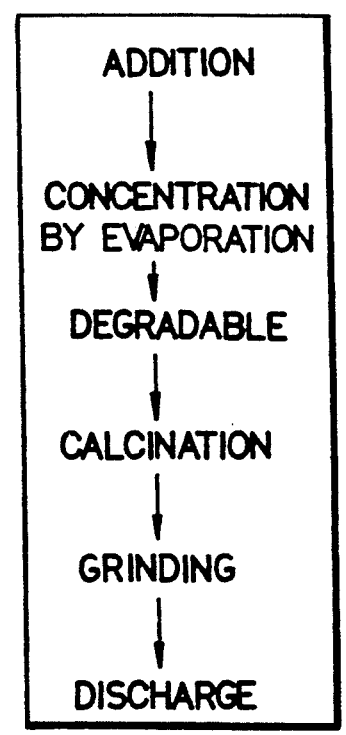
FIG. IA              FIG. IB

METHOD FOR THE PRODUCTION OF CATALYTICALLY ACTIVE MIXED PHASES

The invention relates to a method for the production of catalytically active mixed phases in powder form, from precursors which contain the elements of the mixed phases, with thermal and mechanical treatment.

Numerous methods are known for the preparation of catalytically active mixed phases of, for example, ternary or quaternary oxides as a basis for the production of catalysts. The manufacturing methods depend on the structure of the desired phase. Usually these manufacturing methods are based on solid reactions in which individual oxides are mixed with one another and then subjected to a heat treatment. Other methods are based on precipitation processes in which the mixed phase is precipitated from a suspension or solution of precursors. In these methods metal salts or organometallic compounds are usually subjected to a precipitation, dried, and crushed, a cure is performed, then they are again dried, shaped and finally again subjected to a heat treatment. Such methods do not in all cases result in pure mixed phases, even when special attention is given to the conduct of the method as regards the temperatures and pressures to be used. In these cases binary oxides are bound into the desired mixed phase as impurities, so that, among other things, catalytic properties are substantially diminished. However, all these previously known methods are based on a great number of process steps entailing complex apparatus and correspondingly high installation costs.

The invention is addressed to the problem of substantially simplifying the method for the production of catalytically active mixed phases in powder form, and of preparing the desired mixed phases without impurities, with less complex apparatus and lower installation cost, preferably at atmospheric pressure and at a lower temperature level.

Setting out from a method of the kind mentioned above, this problem is solved in accordance with the invention in that the precursor contained in a solution or suspension is brought onto heated surfaces of moving heat carrying bodies, and precipitated and dissociated or, more specifically, decomposed on the latter by evaporating the solvent, the mixed phase formed on the heat carrying bodies is removed, and the solid mixed phase is then crushed. On account of this method of procedure, a constantly self-renewing, wettable heat carrying surface is to be made available at a temperature level corresponding to the evaporation temperatures of the suspension or solution, which enables the process to be arranged in a continuous series of the individual stages.

In further development of the invention, the surface of the heat carrying bodies is heated to a higher temperature level exceeding the evaporation temperature of their solvent. In this manner it becomes possible not only to precipitate and dissociate or decompose the precursor, but at the same time to perform the calcination of the mixed phase, thus reducing the amount of time required for the production of the mixed phase in powder form.

The economy of the method for the production of catalytically active mixed phases can be further improved by continuously removing the volatile component of the solvent or suspension, separating it from this entrained solid matter, and feeding it to the portion of the mixed phase that is directly withdrawn from the process.

In a preferred development of the invention, within a reactor whose circumference is circular in cross section or in the shape of a polygon approaching a circle, the mixed phase is removed from the surfaces of the heat carrying bodies by the relative movement within the bed of the bodies, and furthermore the mixed phase is simultaneously ground as well as separated continuously or discontinuously from the circuit of the heat carrying bodies. By this procedure the individual steps of the process are performed within a moving bed of the heat carrying bodies, and the temperature of the bodies can be adapted to the optimum for the individual steps of the process. It is thus possible to avoid exceeding or falling below the temperature level which would result in losses in the activity of the mixed crystals that are formed.

The way in which the heat carrying bodies are circulated is furthermore practiced advantageously within a reactor disposed for rotation about an approximately horizontal axis and having a spherical circumference or a polyhedral surface approaching the spherical shape, the heat carrying bodies being advanced continually upward by contact with the reactor wall, falling back down by gravity, and being turned over.

Especially advantageous toward maintaining the temperature within close tolerances is a method in which the heat carrying bodies, in a reactor with a tubular outer wall and an axis of rotation inclined from the horizontal are transported upward by contact with the reactor wall in the direction of rotation of the reactor, and fall down again by gravity, and at the same time are carried axially as well as turned over, from the point where the precursor enters to the point where the mixed phase is removed at the other end of the tubular reactor, and furthermore the heat carrying bodies are positively returned, after the removal of at least a portion of the mixed phase, to the area where the precursor is fed in. The term, "tubular reactor," is also to be understood to refer to a reactor of a substantially conical or truncoconical configuration.

In a configuration different from this the heat carrying bodies are carried substantially by gravity vertically downward and at the same time turned over within a reactor with a substantially vertical axis of symmetry by relative movement of the reactor wall, from an upper point of entry of the precursor to a lower exit of the heat carrying bodies, and furthermore the heat carrying bodies are positively returned vertically upward from their point of exit to the point of entry of the precursor, completing their circuit. In this variant, with a vertical arrangement of the vessel axis above the point of entry of the precursors and [the point] of the formation of the mixed phase, a quasi static bed of the heat carrying bodies can be disposed as a filter and/or an additional one can be disposed in order to limit emissions.

The reheating of the heat carrying bodies, or the adjustment of their surface to the temperature level necessary for the individual section of the process, can be performed advantageously especially by delivering heat to them, during their movement within the reactor, indirectly through the reactor wall and/or through the means used to propel them. The ball diameter or the ratio of mixture of balls of different diameter is in this case made dependent upon the desired fineness of grind an the optimum temperature for the precipitation and dissociation decomposition or simultaneous calcination thereof. By the vertical stratification of balls of different diameter that develops, the grinding function is better separated from the heat carrying function.

BRIEF DESCRIPTION OF THE DRAWING

To explain the method of the invention, FIG. 1B will be compared in the accompanying drawing with a precipitation method of FIG. 1A in accordance with the state of the art.

In the block diagram A there is shown a precipitation process in accordance with the state of the art, taken from "Catalyse de Contact," le Page, Inst. Française du Pétrole, p. 396.

The precursors 1 and 2 are in this case fed to a stirring container in which the precipitation is performed. Then the precipitate obtained is subjected to a preliminary dewatering and then to a secondary drying. The dry substance obtained in this manner is then crushed and afterward subjected to a curing process in another process apparatus. Moisture is again removed in dryers from the product obtained by this curing process, prior to the calcination of the previously obtained dry substance in kilns.

The individual steps of the procedure in accordance with the invention are to be seen in diagram B.

Starting with the placement of the precursors on the surfaces of moving heat carrying bodies, the precursors are concentrated on them by evaporation, and decomposed, and then the mixed phase is calcined. The catalytically active mixed phase that is formed is then removed from the surfaces of the heat carrying bodies and ground, and discharged continuously or discontinuously, in accordance with the desired fineness of grind. Through the free choice of the process parameters, especially the temperature management within the moving bed, the length of time for which the bodies are stirred, and their relative velocity, it is possible to form optimum liquid film thicknesses as well as precipitations on the heat carrying bodies within optimum rates of precipitation, which equally determine the nucleation and seed growth rate of the solid phase. The same applies to the temperatures in the calcination and the fineness of grind.

EXAMPLES

A drum with a diameter of 350 mm and a depth or length of 300 mm, was packed with commercial corundum grinding balls in the amount of 10 kg, and a ball diameter of 8–15 mm. The drum was slightly tilted from the horizontal and mounted for rotation by a motor through a controllable transmission. The precursor was fed onto the ball packing at the elevated end of the drum through a lance within a bore disposed axially in the center in the end wall of the drum and the mixed phase was discharged in powder form at the opposite end. For the discharge of the mixed phase the lower end had an annular gap between the wall of the drum and a central disk. The rotational speed of the drum was 4 to 6 revolutions per minute. The outer wall of the drum was heated by gas surface burners connected in series over the depth of the drum. The surface temperature of the grinding balls was kept constant at 450° C., the temperature fluctuations amounting to no more than ±50° C. The temperature control was performed by varying the throughput of the precursor.

Example 1

For the production of copper manganate ($CuMn_2O_4$), a precursor solution of molar copper nitrate solution and bimolar manganate nitrate solution was fed into the drum. A powder was obtained which, on the basis of X-ray structural analysis in accordance with ASTM 11–480, corresponds to the $CuMn_2O_4$ phase.

In the usual manner, the glancing angle obtained by the X-ray analysis was compared with the ASTM standards.

Example 2

A powder was obtained which corresponds to the phase $CuCr_2O4$ according to X-ray structural analysis per ASTM 26-508.

As previously described, the glancing angles obtained on the basis of the X-ray structural analysis were compared with the ASTM standards.

Example 3

For the production of a mixed phase of titanium-vanadium oxide, a precursor hydrolyzate of titanium tetrachloride in water was prepared with ammonium vanadate dissolved in it. By spraying this precursor in a spray dryer at 350° C. and then calcining it at 450° C. for one hour, an ochre-yellow to brown colored powder is obtained. The brownish yellow color points to a content of free vanadium pentoxide in the mixed phase. After dissolving the free vanadium pentoxide out of the mixed phase with 0.5-molar oxalic acid, a dark green to anthracite-colored powder is obtained. The amount of vanadium oxide dissolved out can be determined by photometry in the separated solution.

Example 4

For the preparation of a mixed phase of titanium-vanadium oxide, a precursor hydrolyzate of titanium tetrachloride in water was prepared with ammonium vanadate dissolved in it as in Example 3.

By spraying the precursor onto a heated drum whose temperature was 450° C., a powder was obtained whose yellow-brown, slightly greenish color points to a content of free vanadium pentoxide in the mixed phase, in a manner similar to Example 3. The free vanadium oxide was again dissolved out of the mixed phase with 0.5-molar oxalic acid. After filtration a dark green to anthracite-colored powder is again obtained. In the separated solution the amount of vanadium pentoxide dissolved out can be determined by photometry.

Example 5

For the production of a mixed phase of titanium-vanadium oxide, a precursor hydrolyzate of titanium tetrachloride in water was prepared with ammonium vanadate dissolved in it, and then, in accordance with the method of the invention, it was placed on a charge of balls within a drum the same as in the procedure described in Examples 1 and 2. A dark green to anthracite-colored powder was obtained, which has a BET surface area (surface area measurement according to Brunauer/Emmett and Teller) of 90 m$^2$/g. The color of the mixed phase obtained indicates a negligibly small content of the undesired component free vanadium pentoxide in the mixed phase. Thus the ratio of titanium and vanadium in the mixed phase corresponds to the ratio in the precursor. For the special application, this ratio can thus be adjusted directly by choosing the corresponding solution. The small content of free vanadium pentoxide in the mixed phase can be determined as described in Examples 1 and 2.

In a test apparatus, 1 g of the powder obtained in accordance with Examples 3–5 was weighed in and flooded with a gas mixture of 1000 ppm NO, 1000 ppm $NH_3$, 3% oxygen, balance $N_2$. The rate of flow of the gas mixture at 25° C. was 13.5 $cm^3$/sec. The rate of the reduction of NO was determined in relation to the reactor temperature.

TABLE 1

| Sample per Example No. | 200° C. | 250° C. | 300° C. | 350° C. | 400° C. |
|---|---|---|---|---|---|
| 3 | 50 | 77 | 86 | 62 | 0 |
| 4 | 63 | 88 | 97 | 99 | 95 |
| 5 | 86 | 99 | 100 | 100 | 100 |

For the mixed phase, a titanium to vanadium atom ratio Ti:V=1:0.18 was established in the precursor in all examples.

The above table indicates a considerable loss of activity in the high-temperature range in the mixed phases prepared by the conventional methods in Examples 3 and 4. This activity loss is connected with the presence of free $V_2O_5$.

In the following table the extinctions of the solutions in Examples 3 to 5 are shown, which were obtained by dissolving the free vanadium pentoxide on 0.5-molar oxalic acid.

TABLE 2

| Sample in accord with Example | 3 | 4 | 5 |
|---|---|---|---|
| Extinction at 780 mm | 0.851 | 0.73 | 0.125 |

The extinction characterizing the vanadium pentoxide in the solution and thus the free vanadium pentoxide in the mixed phase correlates with the activity loss at high temperatures as indicated in Table 1.

By the method in accordance with the invention numerous other mixed phases can be produced advantageously, in virtually pure form, with other systems of substances. Examples of such mixed phases are iron molybdate mixed phases or bismuth-nickel-iron molybdate mixed phases.

The powder obtained is applied to support structures in the usual manner as the catalytically active compound. For this purpose commercial binding agents are used, preferably those used for ceramic compositions. The method of the invention furthermore offers the possibility of selecting the grain size distribution of the solid mixed phase product by varying the rotatory speed, the ball size and the degree of fill in the reactor.

We claim:

1. Method for the production of catalytically active mixed phases in powder form from precursors which contain the elements of the mixed phases, with thermal and mechanical treatment, in which method the precursor contained in a solution containing a solvent is applied to heated surfaces of moving heat carrying bodies, precipitated on said bodies with evaporation of the solvent, and decomposed, and calcined, the mixed phase formed on the heat carrying bodies is removed from the heat carrying bodies, and the mixed phase is subsequently crushed.

2. Method in accordance with claim 1, wherein the precursor is precipitated on surfaces heated above the evaporation temperature of its solvent and at the same time decomposed as well as calcined.

3. Method in accordance with claim 1 or 2, wherein the volatile component of the solvent is continuously removed, the solid matter carried with the latter is separated, and is delivered to the portion of the mixed phase that is withdrawn directly from the process.

4. Method in accordance with claim 1 or 2, wherein, from the surfaces of the heat carrying bodies within a reactor having a wall configured in cross section as a circle or as a polygon approaching a circle, the mixed phase is continuously removed by its relative movement within its bed, and furthermore the mixed phase is simultaneously ground as well as continuously or discontinuously separated from the circuit of the heat carrying bodies.

5. Method in accordance with claim 4, wherein the heat carrying bodies, within a reactor disposed for rotation about an approximately horizontal axis and having a spherical circumference or a polyhedral surface approaching a spherical one, are continuously driven upwardly by contact with the reactor wall and carried downward as well as turned by the force of gravity.

6. Method in accordance with claim 4, wherein the heat carrying bodies, within a reactor with a tubular periphery and with an axis of rotation disposed at an inclination from the horizontal, are driven upward as well as turned over by contact with the reactor wall in its direction of rotation and downward by the force of gravity and at the same time they are driven axially from the entry of the precursor at the one end to the discharge of the mixed phase at the other end of the tubular reactor.

7. Method in accordance with claim 6, wherein the heat carrying bodies are taken out at the lower end of the reactor and, after removal of at least a portion of the mixed phase, they are positively returned to the area of the entry of the precursor.

8. Method in accordance with claim 4, wherein the heat carrying bodies are carried by the force of gravity, and simultaneously stirred, automatically downward vertically within a reactor with a substantially vertical axis of symmetry, with relative movement of the reactor wall, from an upper entry of the precursor to a lower discharge of the heat carrying bodies, and furthermore the heat carrying bodies are subsequently returned positively vertically upward from their discharge into the area where the precursor enters.

9. Method in accordance with claim 4, wherein heat is indirectly fed through the wall of the reactor to the heat carrying bodies during their movement within the reactor.

10. Method in accordance with claim 8, wherein heat is indirectly fed to the heat carrying bodies through means which are used to propel said bodies.

* * * * *